United States Patent [19]
Oda et al.

[11] Patent Number: 4,736,212
[45] Date of Patent: Apr. 5, 1988

[54] INK JET RECORDING APPARATUS

[75] Inventors: Gen Oda, Sagamihara; Masayoshi Miura; Kenji Akami, both of Kawasaki, all of Japan

[73] Assignee: Matsushita Electric Industrial, Co., Ltd., Japan

[21] Appl. No.: 896,340

[22] Filed: Aug. 13, 1986

[30] Foreign Application Priority Data

Aug. 13, 1985 [JP] Japan ................................ 60-177908
Aug. 13, 1985 [JP] Japan ................................ 60-177907
Sep. 24, 1985 [JP] Japan ................................ 60-195126

[51] Int. Cl.$^4$ .......................... G01D 15/18; B41J 3/04
[52] U.S. Cl. .................................................. 346/140 R
[58] Field of Search .................................. 346/140, 75

[56] References Cited

U.S. PATENT DOCUMENTS

| | | | |
|---|---|---|---|
| 4,164,745 | 8/1979 | Cielo et al. . | |
| 4,312,009 | 1/1982 | Lange | 346/140 |
| 4,358,781 | 11/1982 | Yamamori | 346/140 |
| 4,555,717 | 11/1985 | Miura et al. . | |
| 4,613,875 | 9/1986 | Le | 346/140 |

FOREIGN PATENT DOCUMENTS

| | | |
|---|---|---|
| 0061327 | 9/1982 | European Pat. Off. . |
| 3204661 | 8/1983 | Fed. Rep. of Germany . |
| 57-156268 | 9/1982 | Japan . |

*Primary Examiner*—Joseph W. Hartary
*Attorney, Agent, or Firm*—Lowe, Price, LeBlanc, Becker & Shur

[57] ABSTRACT

An air passage is defined by and between an air nozzle plate having at least one air discharge port and an ink nozzle plate having a plurality of ink discharge ports, and projections are disposed in the air passage between the ink discharge ports and extend in a direction normal to the direction in which the ink discharge ports are arrayed, each of the projections having a length smaller than the width of the air passage. The projections substantially divide the air passage in the direction of the array of the ink discharge ports into different sections associated with the ink and air discharge ports. The projections may be structurally integral with the ink nozzle plate or the air nozzle plate so that an ink jet recording head can simply be assembled.

18 Claims, 7 Drawing Sheets

INK JET RECORDING APPARATUS

BACKGROUND OF THE INVENTION

The present invention relates to an ink jet recording apparatus for utilizing air streams to eject ink to record characters, images, or the like on a recording medium.

One prior ink jet recording head utilizing air streams is illustrated in FIGS. 1 through 4. As shown in FIGS. 1 and 2, the ink jet recording head, designated by the reference numeral 112, includes a body 101, an air nozzle plate 102 of an insulating material attached to the outer end of an outer wall 101*a* of the body 101, and an ink nozzle plate 103 of an insulating material attached to the outer end of an inner wall 101*b* of the body 101. The outer and inner walls 101*a*, 101*b* of the body 101 define therebetween an air chamber 104 communicating with an air passage 105 defined between the air nozzle plate 102 and the ink nozzle plate 103. The body 101 has an ink chamber 106 defined inwardly of and by the ink nozzle plate 103 and the inner wall 101*b*. The ink nozzle plate 103 has a plurality of ink discharge ports 107, and the air nozzle plate 101 has a plurality of air discharge ports 108 in alignment with the ink discharge ports 107, respectively. A common electrode 109 of flat configuration is mounted on the outer surface of the air nozzle plate 102 around the air discharge ports 108. Separate control electrodes 110 are mounted on the inner surface of the ink nozzle plate 103 around the ink discharge ports 107. The electrodes 110 are connnected to signal sources 111. An air supply passage 113 has an end connected to the air chamber 104, and an ink supply passage 114 has an end connected to the ink chamber 106.

FIG. 3 shows an overall arrangement of an ink jet recording apparatus incorporating the ink jet recording head 112. In FIG. 3, the other end of the air supply passage 113 is coupled to an air source 115, and the other end of the ink supply passage 114 is coupled to an ink tank 116. An air supply passage 117 branched from the air supply passage 113 is connected to an upper end of the ink tank 116.

Operation of the conventional ink jet recording head will be described below. Air is supplied from the air source 115 via the air supply passage 113 into the air chamber 104, from which it flows through a sharp bend as an air layer into the air passage 105 at a constant speed. The air flow is sharply bent in the vicinity of the air discharge ports 108 and the ink discharge ports 107 and goes into the air discharge ports 108. The ink chamber 106 is always filled with ink fed from the ink tank 116 through the ink supply passage 114. The ink in the ink tank 116 and the ink chamber 106 is subjected to a constant pressure by the pressure of air supplied from the air source 115 via the air supply passage 117 into the ink tank 116. The pressure of the ink in the ink discharge ports 107 is substantially equalized under the constant pressure to the pressure of air flowing near the ink discharge ports 107 while the ink jet recording head is not in operation, so that the meniscus of the ink in the ink discharge ports 107 is held at rest. When there is a potential difference between the common electrode 109 and the control electrodes 110, the meniscus of the ink in the ink discharge ports 107 is stretched toward the air discharge ports 108 by an electrostatic force produced by the potential difference. Since there is an abrupt change in the pressure gradient created by the air flow in the air passage 105 from the ink discharge ports 107 to the air discharge ports 108, when the meniscus of the ink in the ink discharge ports 107 is stretched beyond a certain length or interval, the ink is abruptly accelerated from the ink discharge ports 107 across the air passage 105 toward the air discharge ports 106 and expelled out of the air discharge ports 106.

FIG. 4 schematically shows the arrangement of FIG. 2 as a simplified system. Conditions for stably holding the ink in the ink discharge ports 107 will be described with reference to FIG. 4. The pressure Pa of air delivered into the air chamber 104 is substantially equal to the air pressure in the air source 115 if the air supply passage 113 from the air source 115 to the head 112 has no pressure loss or only a negligible pressure loss. The pressure Pi of ink in the ink chamber 106 is substantially equal to the ink pressure in the ink tank 116 and also the air pressure in the air source 115. Therefore, assuming that the air supply passages 113, 117 have no pressure loss or only a negligible pressure loss, the air pressure Pa is approximately equal to Pi. In order to keep a meniscus 118 of ink in the ink discharge port 107, the ink pressure Pi in the ink discharge port 117 is required to be substantially equal to the air pressure Pn in the vicinity of the ink discharge port 107. Therefore, the conventional ink jet recording head has been dimensionally and structurally designed to reduce the pressure loss of the air in the air passage 105 between the air and ink nozzle plates 102, 103 so that the air pressure Pa is approximately equal to the air pressure Pn to make the air and ink pressures Pa, Pi approximately equal to each other, thus stably keeping the meniscus 118 at the ink discharge port 107.

With the multinozzle ink jet head 112 having the plural air and ink discharge ports 108, 107, it is quite difficult to equalize and stably keep the meniscus at the respective ink discharge ports 107. The air passage 105 has a small thickness of about 100 micrometers, and a slight variation in the thickness of the air passage 105 would result in a change in the air pressure Pn near the ink discharge port 107. It has been highly difficult to manufacture the ink jet recording head while controlling the thickness of the air passage 105 to be uniform at all of the ink discharge ports 107.

One conventional solution has been to place a spacer of constant thickness between the air and ink nozzle plates 102, 103, thus spacing them from each other by a constant distance.

Where such a spacer is bonded by adhesive layers between the air and ink nozzle plates 102, 103, the thickness of the adhesive layers used tends to differ from place to place, and the air passage 105 is often apt to have varying thicknesses. As a result, the air pressure Pn near the ink discharge ports 107 varies due to thickness irregularities of the air passage 105. The ink meniscuses are therefore not, uniformly stabilized, and the responses, the amounts of discharged ink, and the threshold voltages (minimum recording voltage) are varied from discharge port to discharge port, resulting in different recording characteristics exhibited by the ink jet recording head.

When the ink jet recording head is shocked to cause ink to flow from the ink discharge port 107 into the air passage 105, such ink is trapped and cannot easily be removed irrespective of the air flow in the air passage 105. This is because air is liable to flow out more easily from an adjacent air discharge port 108 than from the air discharge port 108 where the ink is trapped. The recording characteristic at such a disabled head area is lowered, and hence the multinozzle ink jet recording head has varying recording characteristics.

SUMMARY OF THE INVENTION

It is an object of the present invention to provide an ink jet recording apparatus capable of removing ink trapped in an air passage for better recording characteristics and of uniformizing air pressures near ink discharge ports for improved recording characteristics.

According to the present invention, an air passage is defined by and between an air nozzle plate having at least one air discharge port and an ink nozzle plate having a plurality of ink discharge ports, and projections are disposed in the air passage between the ink discharge ports and extend in a direction normal to the direction in which the ink discharge ports are arrayed, each of the projections having a length smaller than the width of the air passage. The projections serve to substantially divide the air passage in the direction of the array of the ink discharge ports. Therefore, the air pressures near the ink discharge ports are uniformized, and the ink meniscuses at the ink discharge ports are rendered substantially uniform. Even when ink from one of the ink discharge ports is trapped in the air passage, such trapped ink can relatively easily be discharged from the air discharge port since air is forced to flow independently through a region in which the ink is trapped. The projections may be structurally integral with the ink nozzle plate or the air nozzle plate so that an ink jet recording head can be easily assembled.

BRIEF DESCRIPTION OF THE DRAWINGS

The present invention will be described in detail by way of illustrative example with reference to the accompanying drawings, in which.

DETAILED DESCRIPTION

Figure 1:
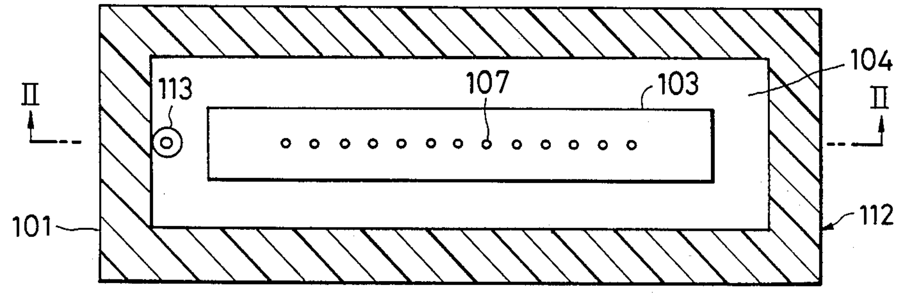
FIG. 1 PRIOR ART
FIG. 1 is a cross-sectional view of a conventional ink jet recording head, taken along line I—I of FIG. 2.
Figure 2:
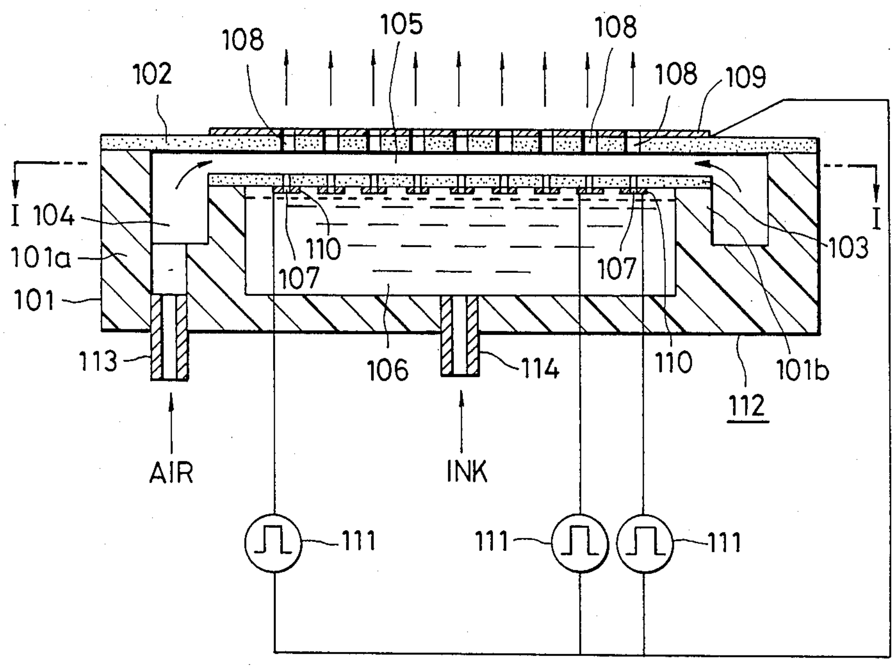
FIG. 2 PRIOR ART
FIG. 2 is a cross-sectional view taken along line II—II of FIG. 1.

Like or corresponding reference characters denote like or corresponding parts throughout several views.

Figure 5:
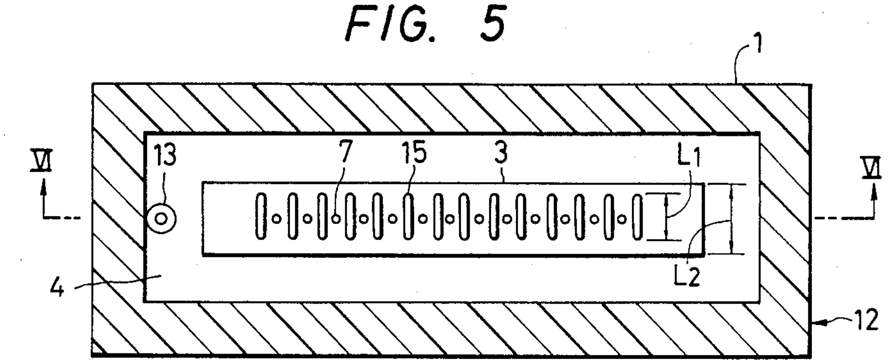
FIG. 5 is a cross-sectional view of an ink jet recording head according to an embodiment of the present invention, taken along line V—V of FIG. 6.
Figure 6:
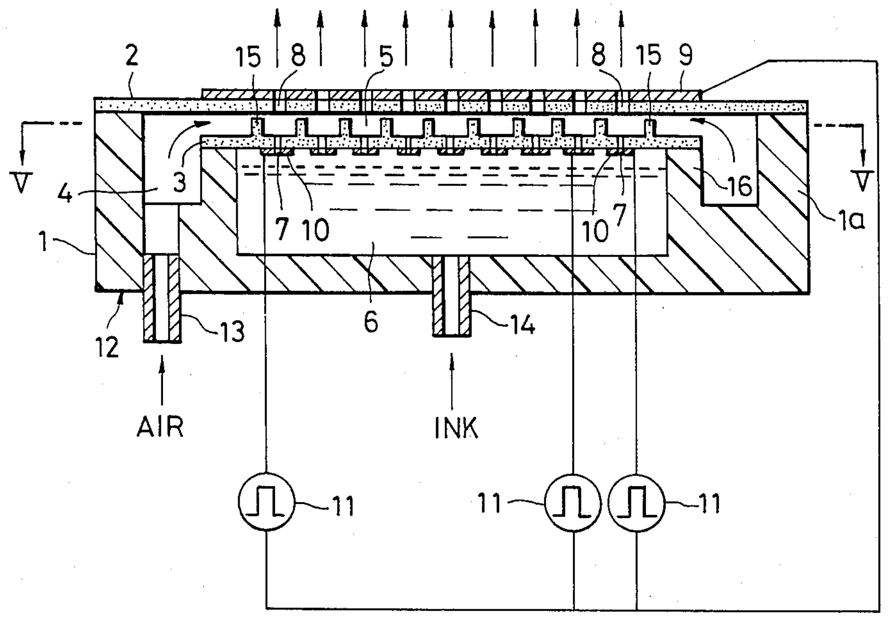
FIG. 6 is a cross-sectional view taken along line VI—VI of FIG. 5.

FIGS. 5 and 6 illustrate an ink jet recording head in an ink jet recording apparatus according to the present invention. The ink jet recording head, generally designated by the reference numeral 12, includes a body 1, an air nozzle plate 2 of an insulating material attached to the outer end of an outer wall 1*a* of the body 1, and an ink nozzle plate 3 of an insulating material attached to the outer end of an inner wall 1*b* of the body 1. The outer and inner walls 1*a*, 1*b* of the body 1 define therebetween an air chamber 4 communicating with an air passage 5 defined as a gap between the air nozzle plate 2 and the ink nozzle plate 3. The body 1 has an ink chamber 6 defined inwardly of and by the ink nozzle plate 3 and the inner wall 1*b*. The ink nozzle plate 3 has an array of ink discharge ports 7, and the air nozzle plate 1 has an array of air discharge ports 8 in alignment with the ink discharge ports 7, respectively. A common electrode 9 of flat configuration is mounted on the outer surface of the air nozzle plate 2 around the air discharge ports 8. Separate control electrodes 10 are mounted on the inner surface of the ink nozzle plate 3 around the ink discharge ports 7. The electrodes 9, 10 are connected to signal sources 11. An air supply passage 13 has an end connected to the air chamber 4, and an ink supply passage 14 has an end connected to the ink chamber 6.

Figure 12:
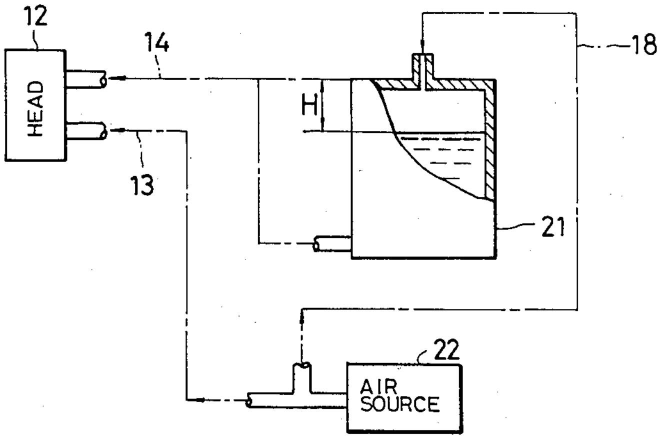
FIG. 12 is a schematic side elevational view of an ink and air, supply system of an ink jet recording apparatus according to the present invention.

As shown in FIG. 12, the other end of the air supply passage 13 is coupled to an air source 22, and the other end of the ink supply passage 14 is coupled to an ink tank 21. An air supply passage 18 branched from the air supply passage 13 is connected to an upper end of the ink tank 16.

As illustrated in FIGS. 5 and 6, an array of projections 15 structurally integral with the ink nozzle plate 3 is disposed in the air passage 5 between the ink discharge ports 7 and extends in a direction normal to the direction in which the ink discharge ports 7 are arrayed. The projections 15 terminate short of the air nozzle plate 2 with a small clearance left between the projections 15 and the air nozzle plate 2. Each of the projections 15 has a length L1 smaller than the width L2 of the air passage 5, i.e., the ink nozzle plate 3, so that the projections 15 do not completely block the air passage 5, but leave gaps or spacer alongside of the array of projections 15, i.e., between the ends of the projections 15 and the inner side surfaces of the air passage 5, for allowing air to flow through the gaps in the air passage 5. The ends of the projections 15 are beveled so as not to disturb such an air flow through the clearances. In the illustrated embodiment, the beveled ends of the projections 15 are of an arcuate cross-sectional shape.

The ends of the projections 15 terminate short of the inner side surfaces of the air passage 5 for the reason of minimizing the effect of any resistance-dependent pressure loss to increase the stability of ink meniscuses at the ink discharge ports 7. The length L1 of each of the projections 15 has an optimum value which is smaller than the width L2 of the air passage 5 for stabilizing the ink meniscuses. The length L1 and the width L2 vary with the thickness of the air passage 5, and are in the following relationship:

$$(\tfrac{1}{3})L2 < L1 < L2$$

The principles of operation of the ink jet recording head 12 for ejecting the ink are the same as those described with reference to FIGS. 1 through 4. Since the air passage 5 is roughly divided by the projections 15 into different sections associated with the respective ink discharge ports 7, ink flows from the ink discharge ports 7 and air flows in such air passage sections are prevented from interfering with each other, and the air pressure near the ink discharge ports 7 and the air discharge ports 8 are uniformized even if the thickness of the air passage 5 is varied. Therefore, the ink meniscuses are rendered substantially uniformly. Even when ink from any of the ink discharge ports 7 is trapped in the air passage 5, air is forced to flow independently through the air passage section communicating with that ink discharge port 7 thereby to expel the trapped ink out of the air discharge port 8. The responses, the amounts of expelled ink, and the threshold voltages for the respective ink nozzles are uniformized to provide uniform recording characteristics.

In the above embodiment, the height of the projections 15 are slightly smaller than the thickness of the air passage 5, providing a thin continuous gap above the array of projections 15 to allow a continuous upper air layer to flow through such a gap. While the projections 15 may be joined to the air nozzle plate 2, such a continuous gap over the array of projections 15 for a continuous air layer to flow over the array of projections 15 is more advantageous.

Figure 7:
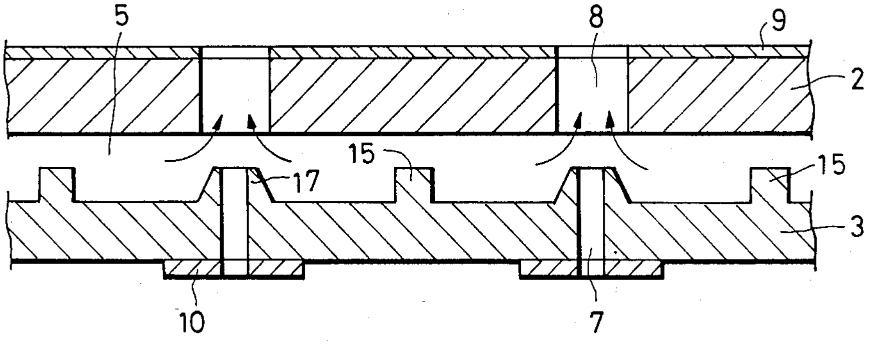
FIGS. 7 and 8 are cross-sectional views of ink jet recording heads according to other embodiments of the present invention.

FIG. 7 shows an ink jet recording head in an ink jet recording apparatus according tc another embodiment of the present invention. In this embodiment, the gap defined between each projection 15 and the air nozzle plate 2 is selected to be about $\frac{1}{3}$ through $\frac{2}{3}$ of the distance between the air nozzle plate 2 and the ink nozzle plate 3. Each projection 15 has a length (corresponding to L1 in FIG. 5) which is the same as or smaller than the width (corresponding to L2 in FIG. 5) of the ink nozzle plate 3. Therefore, the air passage 5 is substantially completely divided in the direction of the projection array into different sections communicating respectively with the air discharge ports 8 and the ink discharge ports 7. The outlet end of each of the ink discharge ports 7 is surrounded by a tapered projecting mouth 17 for causing the air flow in the air passage 5 to be sharply directed into the air discharge port 8, from which the air flow is discharged.

According to the embodiment of FIG. 7, since the air passage 5 is substantially completely divided by the projections 15 into different sections communicating respectively with the air discharge ports 8 and the ink discharge ports 7, the speeds of air flowing from the air chamber into the air discharge ports 8 and then out of the discharge ports 8 are uniformized. The projections 15 may be formed by partly etching a panel of photosensitive synthetic resin or glass when forming the ink discharge ports 7 in the ink nozzle plate 3. More specifically, the structure of FIG. 7 can be made by forming the ink nozzle plate 3 of photosensitive glass, for example, then forming the tapered projecting mouths 17 and the projections 15 in a first etching process, and finally forming the ink discharge ports 7 in a second etching process.

Figure 8:
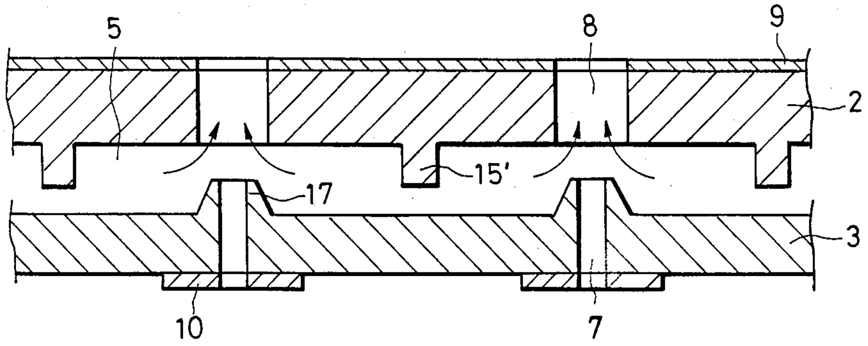

Rather than forming the projections 15 on the ink nozzle plate 3 as shown in FIG. 7, projections 15' may be formed on the air nozzle plate 2 as shown in FIG. 8.

Figure 9:
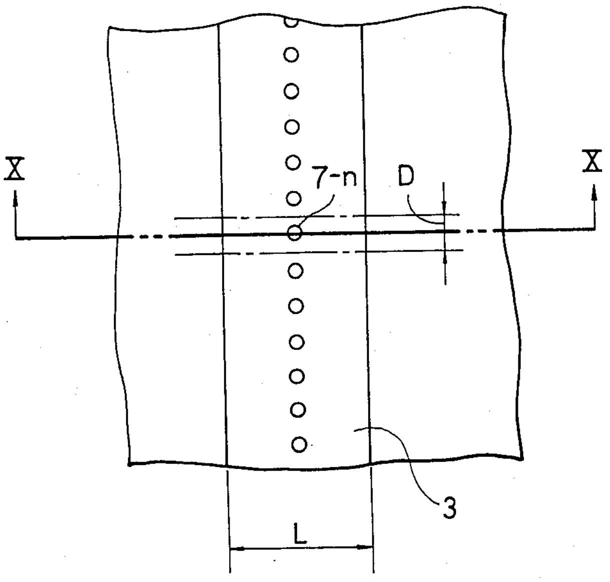
FIG. 9 is a fragmentary plan view of an ink jet recording head according to still another embodiment of the present invention, the view being taken along line IX—IX of FIG. 10.
Figure 10:
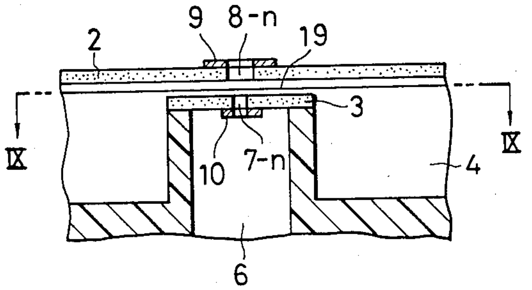
FIG. 10 is a fragmentary cross-sectional view taken along line X—X of FIG. 9.

FIGS. 9 and 10 are illustrative of an ink jet recording head according to still another embodiment of the present invention. The ink jet recording head includes an ink nozzle plate 3 having an array of ink discharge ports 7-n spaced at a constant pitch D in the longitudinal direction of the ink nozzle plate 3, and an air nozzle plate 2 having an array of air discharge ports 8-n defined in alignment respectively with the ink discharge ports 7-n. The ink nozzle plate 3 and the air nozzle plate 2 are spaced from each other to allow an air layer 19 to flow therebetween. A common electrode 9 shared by the air discharge ports 8-n is mounted on the outer surface of the air nozzle plate 2 around the air discharge ports 8-n. Separate electrodes 10 are mounted on the inner surface of the ink nozzle plate 3 respectively around the ink discharge ports 7-n, the electrodes 10 being disposed in an ink chamber 6 defined inwardly of the ink nozzle plate 3.

The pressure Pn of air in the vicinity of each of the ink discharge ports 7-n is primarily determined by:

(1) the air pressure Pa from the air source;

(2) the pitch D at which the air or ink discharge ports 8-n, 7-n are spaced;

(3) the distance T between the air and ink nozzle plates 2, 3;

(4) the diameter DA and length LA of the air discharge ports 2; and (5) the width L of the ink nozzle plate 3 or the air layer 19.

The air pressure Pa is normally in the range of from 0.1 to 0.15 $kg/cm^2$. The air pressure of about 0.1 $kg/cm^2$ or higher is required to accelerate ink drawn out of the ink discharge ports 7-n. The air pressure Pa is related to the rate of flow of air in the air layer 19. The lower the air pressure Pa, the smaller the value (Pa - Pn). The air pressure Pa should be set to a value required to accelerate ink, but not be varied to reduce the value (Pa - Pn).

The pitch D is selected to meet the way in which the multinozzle ink jet recording head is used or the purpose for which it is used. The distance T affects the characteristics of the discharging of ink from the ink discharge ports 7-n. If the distance T exceeds a certain value (about 100 micrometers), then the response is sharply lowered. Therefore, it would not be a good approach to reduce the value (Pa - Pn) by increasing the distance T as it would affect the ink discharging characteristics. The diameter DA and length LA of the air discharge ports are also related to the air flow rate, and subjected to limitations in order to achieve stable discharging of ink from the ink discharge ports. Specifically, the diameter DA should be about twice the diameter of the ink discharge ports or more, and the length LA should be about three times the diameter DA or less.

It will be understood from the foregoing that only the width L of the ink nozzle plate 3 can be varied in its dimensions relatively freely.

Figure 11:
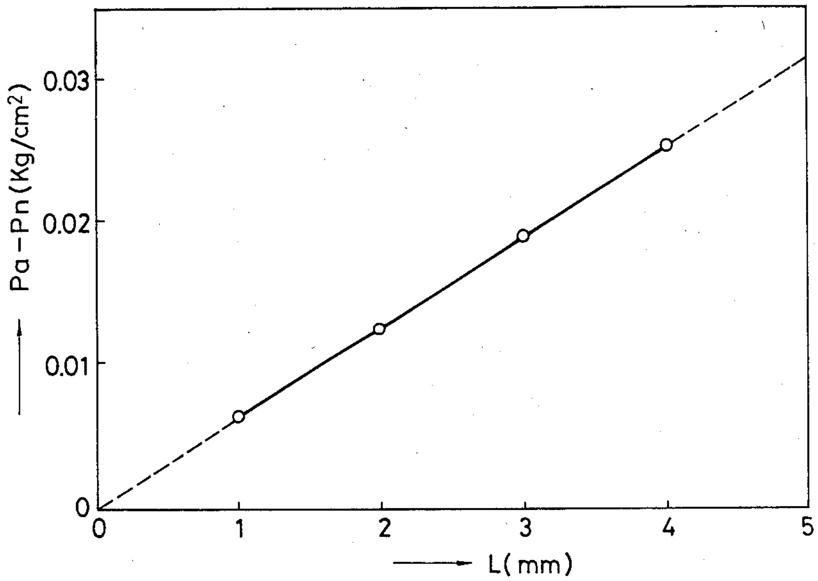
FIG. 11 is a graph showing a characteristic curve of the ink jet recording head of FIG. 9.

An experiment was conducted under the following conditions:

$Pa = 0.125\ kg/cm^2$
$D = 0.5$ mm
$T = 0.1$ mm
$DA = 0.1$ mm
$LA = 0.3$ mm while varying the width L. The results of the experiment are shown in FIG. 11 and indicate that the value (Pa−Pn) increased in proportion to the width L.

For example, when $L = 3$ mm, $Pa - Pn = 0.019\ kg/c^m$. At this time, the air pressure Pn near the ink discharge port 7 is 0.019 kg/cm$^2$ lower than the ink pressure Pi (=Pa) in the ink chamber 6. Therefore, the ink is subjected to a force tending to push the ink out of the ink discharge port 7. Such a pressure difference can be compensated for by positioning the ink jet recording head and the ink tank at different heights. More specifically, assuming that the density of the ink used is 1 g/cm$^3$, the ink tank is lowered so that the ink levels in the ink discharge port 7 and the ink tank are 19 cm apart from each other, for thereby keeping the ink pressure pi in the ink discharge port 7 and the air pressure Pn outside of the ink discharge port 7 in equilibrium.

Another experiment for measuring variations in ink discharging characteristics was also conducted.

Multinozzle ink jet recording heads that were made on a trial basis had 16 ink discharge ports 7-n. By applying a pulse voltage having a pulse duration of 100 microseconds, each of the ink discharge ports 7-n was measured for a minimum voltage (hereinafter referred to as a threshold voltage Vth) required to discharge ink to determine ink discharging characteristics of each ink discharge port. The air pressure Pn in FIG. 11 was the pressure applied to the ink chamber 6 when no air pressure was applied to the ink tank and air flows only into the ink jet recording head, and corresponds to the average of the air pressures Pn acting on the 16 ink discharge ports 7-n. In measuring the threshold voltage Vth, the value (Pa−Pn) was compensated for by the height of the ink tank.

The results of the experiment are given by the following table:

| Head No. | L (mm) | Vth (V) |
|---|---|---|
| 1 | 1 | 350–370 |
| 2 | 2 | 350–390 |
| 3 | 3 | 350–410 |
| 4 | 4 | 350–550 |

The above table shows that for the head No. 1 with the width L of the ink nozzle plate being 1 mm, the threshold voltage Vth ranged from 350 to 370 V and hence was subjected to substantially no variations among the 16 ink discharge ports, whereas for the head No. 4 with the width L being 4 mm, the threshold voltage Vth ranged from 350 to 550 V and hence was subjected to a maximum variation of 200 V among the ink discharge ports. The experimental result for the head No. 4 is caused from the fact that since the air layer 19 underwent an increased degree of viscous resistance, the value (Pa−Pn) increased and the air pressure Pn varied for the respective ink discharge ports 7-n, changing the ink meniscuses at the ink discharge ports 7-n. As a consequence, it has been found that when the value (Pa−Pn) exceeded about 0.02 kg/cm$^2$, the threshold voltage Vth was suddenly subjected to fluctuations or variations. As the value (Pa−Pn) is increased, the difference between the heights of the ink jet recording head and the ink tank is required to be increased, as described above, making the apparatus dimensionally large and impairing the stability of the ink meniscuses at the ink discharge ports when no air flows.

The experimental results given above will naturally change if the pitch D of the ink discharge ports 7-n or the diameter DA of the air discharge ports are varied. In principle, the ink meniscuses at the ink discharge ports can be stabilized and the characteristics of the discharging of the ink from the ink discharge ports 7-n can be rendered uniform by selecting the value of L such that the value (Pa−Pn) will be 0.02 kg/cm$^2$ or less.

Figure 3:
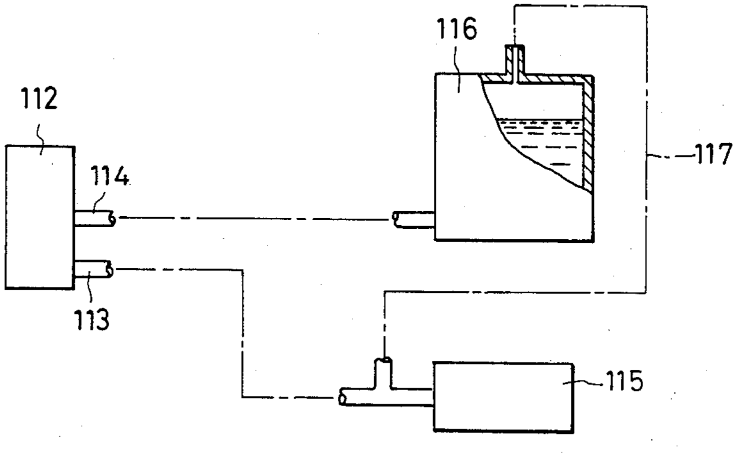
FIG. 3 PRIOR ART
FIG. 3 a schematic fragmentary side elevational view of a conventional ink jet recording apparatus employing the ink jet recording head of FIG. 1.
Figure 4:
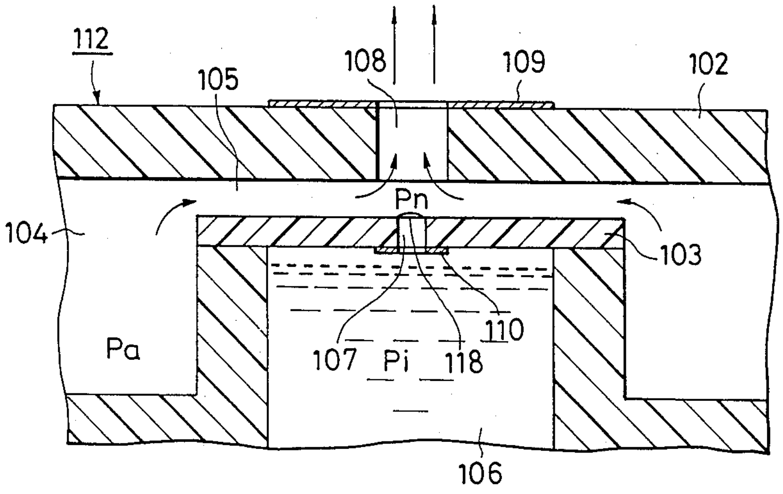
FIG. 4 PRIOR ART
FIG. 4 is an enlarged fragmentary cross-sectional view explanatory of conditions for stably holding ink in an ink discharge port.
Figure 13:
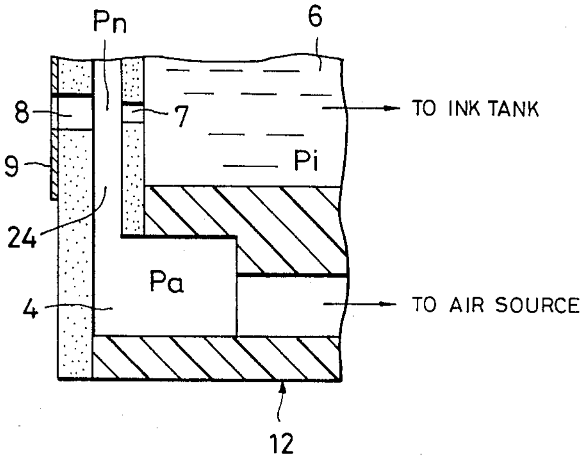
FIG. 13 is a fragmentary cross-sectional view of the ink and air supply system of FIG. 12.

FIGS. 12 and 13 illustrate an ink and air supply system of the ink jet recording apparatus according to the present invention. The prior ink and air supply system shown in FIGS. 3 and 4 is disadvantageous in that when the ink meniscuses are eliminated for some reason, they often cannot be restored. The ink and air supply system of FIGS. 12 and 13 is designed to solve such a problem.

In FIG. 13, the ink pressure Pi in the ink chamber 6 must be higher than the air pressure Pa in the vicinity of the ink discharge port 7. To this end, the air pressure Pn should be lowered. One way of lowering the air pressure Pn is to reduce the air pressure Pa of air supplied into the air chamber 4 of the ink jet recording head 12, so that Pi>Pa=Pn. This can be achieved by providing a resistance to air flow in the air supply passage 13 between the air source 22 and the ink jet recording head 12 so that a pressure loss will be developed in the air supply passage 13.

Another way is to change the dimensions and structure of the ink jet recording head to meet the relationship: Pi=Pa>Pn. More specifically, the distance 24 between the air nozzle plate having the air discharge port 8 and the ink nozzle plate having the ink discharge port 7 is reduced to about 70 micrometers for thereby producing a pressure loss in the air while flowing from the air chamber 4 into the air discharge port 8. Major conditions for the ink and air supply system of FIGS. 12 and 13 are as follows:

(1) the pressures Pa, Pi in the air and ink chambers 4, 6:0.125 kg/cm$^2$;

(2) the air pressure Pn near the ink discharge port 7:0.118 kg/cm$^2$;

(3) the distance H from the ink discharge port 7 to the ink level in the ink tank: 3 cm–6 cm;

(4) the ink density $\rho$: about 1 g/cm$^3$.

Under the foregoing conditions, 1. when no air flow, the ink meniscus at the ink discharge port 7 is kept concave under a vacuum (ranging from - 0.03 kg/cm$^2$ to 0.06 kg/cm$^2$) due to the ink level, and 2. when air flows, a positive pressure of Pi−Pn=0.07 kg/cm$^2$ acts in the ink chamber to cancel out the vacuum due to the ink level, resulting in a positive pressure in the range of from 0.01 to 0.04 kg/cm$^2$ acting on the ink meniscus at the ink discharge port 7 to keep the ink meniscus convex.

An experiment was conducted by supplying air while effecting recording on the ink jet recording head, then cutting off the air supply, and shocking the ink jet recording head 12 and the ink supply system. Air flowed into the ink discharge port 7 to cause the ink to flow back to the ink tank. By supplying air again, the ink that has flowed back to the ink tank was supplied again into the ink jet recording head 12, thus enabling normal recording.

It has been found that when a new ink jet recording head with no ink filled therein is to be connected to the ink and air supply system for recording, and if the ink level lies below the ink discharge port 7 in the head 12, ink will be supplied of its own accord into the ink chamber 6 by supplying an air flow after the new head has been connected, so that recording can be made.

Although certain preferred embodiments of the present invention have been shown and described in detail, it should be understood that various changes and modifications may be made therein without departing from the scope of the appended claims.

We claim:

1. An ink jet recording apparatus comprising:

an ink nozzle plate having an array of ink discharge ports;

an air nozzle plate having at least one air discharge port, said ink and air nozzle plates defining therebetween a gap; and an array of projections disposed in said gap between said ink discharge ports and extending in a direction normal to the direction of said array of ink discharge ports, each of said projections having a length (L1) smaller than a width (L2) of said gap to thereby define spaces alongside said array of projections for allowing air to flow through said spaces toward said air discharge port.

2. An ink jet recording apparatus according to claim 1, wherein each of said projections has beveled opposite ends.

3. An ink jet recording apparatus according to claim 1, wherein each of said projections has a height smaller than a thickness of said gap.

4. An ink jet recording apparatus according to claim 1, wherein said projections are structurally integral with said ink nozzle plate.

5. An ink jet recording apparatus according to claim 1, wherein said projections are structurally integral with said air nozzle plate.

6. An ink jet recording apparatus according to claim 1, wherein said width of said gap is selected to cause an air flow therethrough to have a pressure drop of at most 0.02 $kg/cm^2$ between said air and ink nozzle plates.

7. An ink jet recording apparatus according to claim 1, wherein said ink discharge ports project toward said air discharge port.

8. An ink jet recording apparatus according to claim 1, further including an ink chamber disposed adjacent to and communicating with said ink discharge ports, and an ink tank communicating with said ink chamber and having an ink level lying below said ink discharge ports, said ink tank being supplied with an air pressure for forming convex ink meniscuses respectively at said ink discharge ports.

9. An ink jet recording apparatus according to claim 8, wherein said air pressure supplied to said ink tank is branched from an air pressure applied to said air discharge port.

10. The ink jet recording apparatus of claim 1, wherein said array of projections consists of a single row of projections.

11. An ink jet recording apparatus comprising:

an air nozzle plate having an array of air discharge ports;

an ink nozzle plate having an array of ink discharge ports; and an array of projections disposed between said ink discharge ports or said air discharged ports and extending in a direction normal to the direction of said array of ink discharge ports or air discharge ports, said projections and said air nozzle plate or said ink nozzle plate defining a gap therebetween, each of said projections having a length smaller than a width of said gap, thereby leaving spaces alongside of said array of projections for allowing air to flow through said spaces toward said air discharge ports.

12. An ink jet recording apparatus according to claim 11, wherein said projections are structurally integral with said ink nozzle plate.

13. An ink jet recording apparatus according to claim 11, wherein said ink discharge ports project toward said air discharge ports.

14. An ink jet recording apparatus according to claim 11, wherein the width of said ink nozzle plate in a direction transverse to the direction of said array of ink discharge ports is selected to cause an air flow to have a pressure drop of at most 0.02 $kg/cm^2$ between said air and ink nozzle plates.

15. An ink jet recording apparatus according to claim 11, further including an ink chamber disposed adjacent to and communicating with said ink discharge ports, and an ink tank communicating with said ink chamber and having an ink level lying below said ink discharge ports, said ink tank being supplied with an air pressure for forming convex ink meniscuses respectively at said ink discharge ports.

16. An ink jet recording apparatus according to claim 15, wherein said air pressure supplied to said ink tank is branched from an air pressure applied to said air discharge port.

17. The ink jet recording apparatus of claim 11, wherein said array of projections consists of a single row of projections.

18. An ink jet recording apparatus comprising an ink nozzle plate having an array of ink discharge ports; an air nozzle plate having at least one air discharge port, said ink and air nozzle plates defining therebetween a gap; and an array of projections disposed in said gap between said ink discharge ports, each of said projections having a length greater than its width with the length of said projections extending in a direction perpendicular to the direction of said array of ink discharge ports, said projections being configured to establish a continuous air flow path between the individual ink discharge ports while maintaining substantially uniform air pressure proximate each of said ink discharge ports.

* * * * *

UNITED STATES PATENT AND TRADEMARK OFFICE

CERTIFICATE OF CORRECTION

PATENT NO. : 4,736,212

DATED : April 5, 1988

INVENTOR(S) : Gen Oda et al

It is certified that error appears in the above-identified patent and that said Letters Patent is hereby corrected as shown below:

On the Title page:

At [30] Foreign Application Priority Data

Please correct the third priority data as follows:

--Sep. 4, 1985 [JP] Japan .............60-195126--

Signed and Sealed this

Thirteenth Day of October, 1992

*Attest:*

DOUGLAS B. COMER

*Attesting Officer*

*Acting Commissioner of Patents and Trademarks*